J. THOMPSON.
COUPLING MECHANISM.
APPLICATION FILED APR. 18, 1919.
1,402,912.
Patented Jan. 10, 1922.
4 SHEETS—SHEET 3.
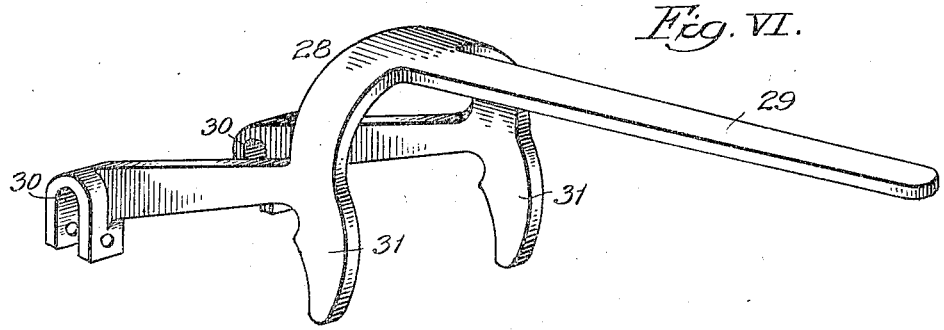
Fig. VI.
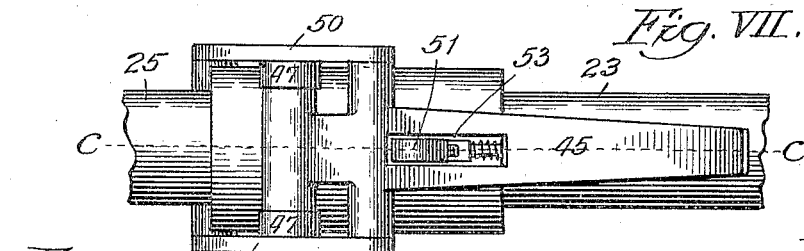
Fig. VII.
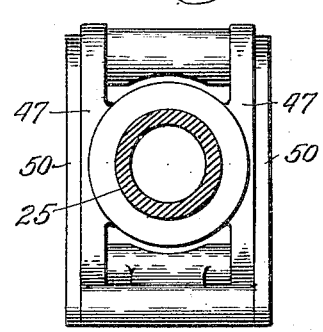
Fig. X.
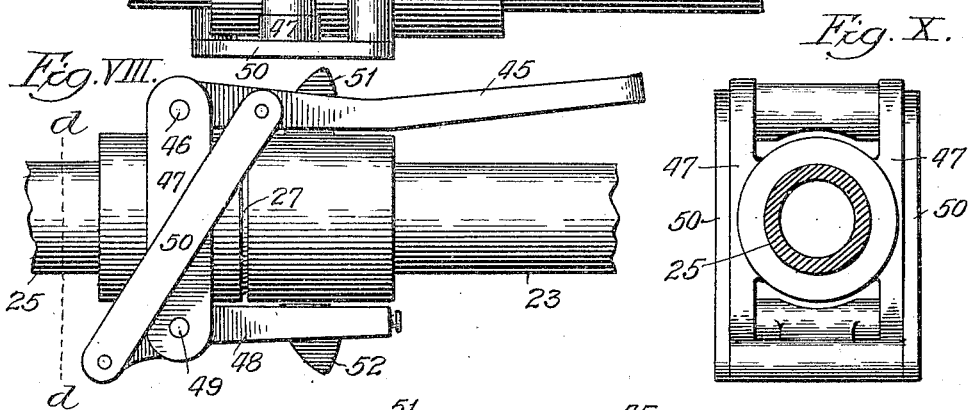
Fig. VIII.
Fig. IX.
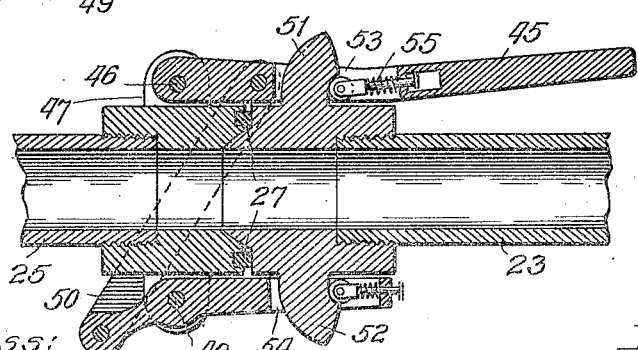
Witness:
John Enders
Inventor:
John Thompson,
by George Mankle
Atty.

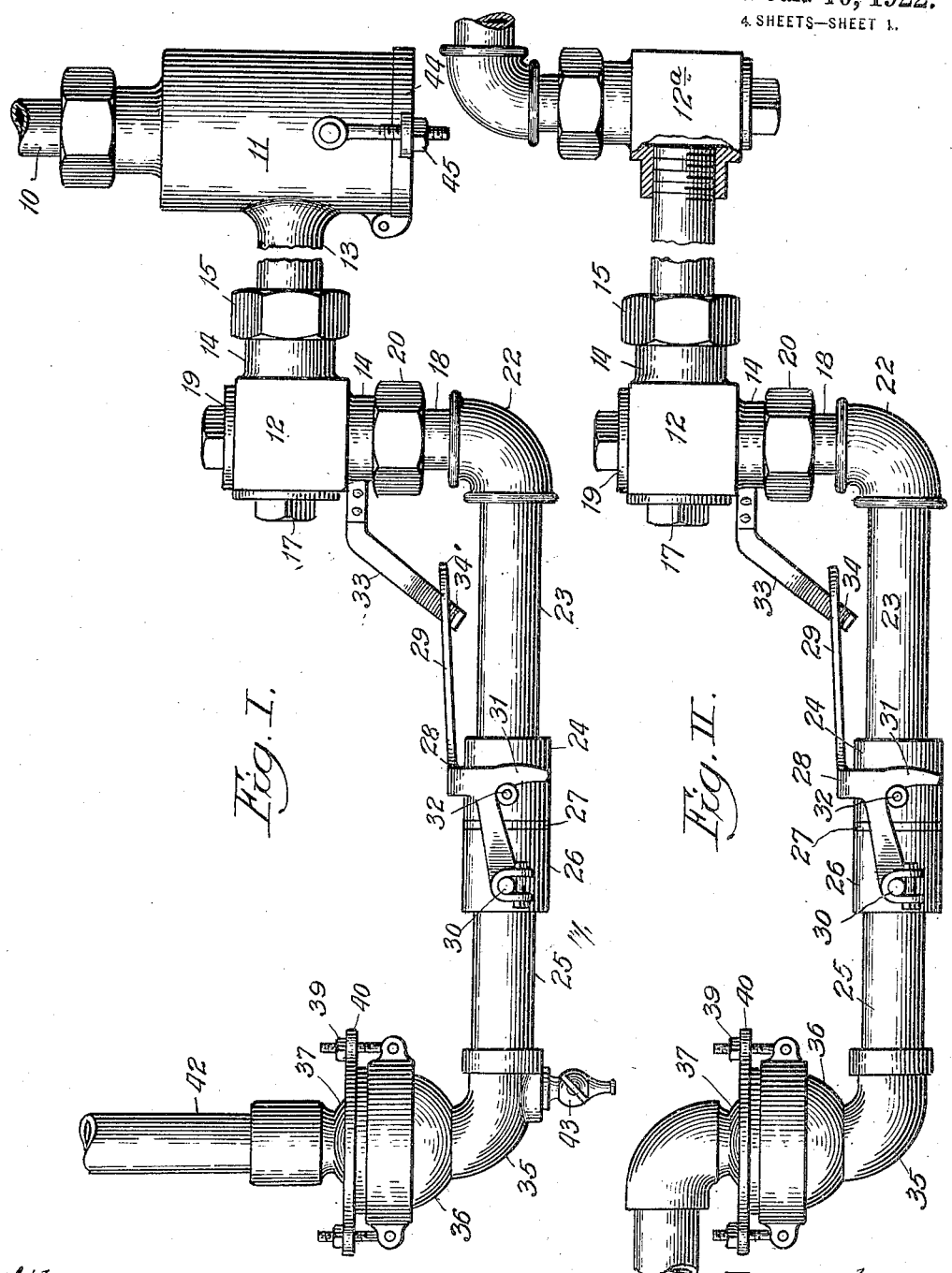

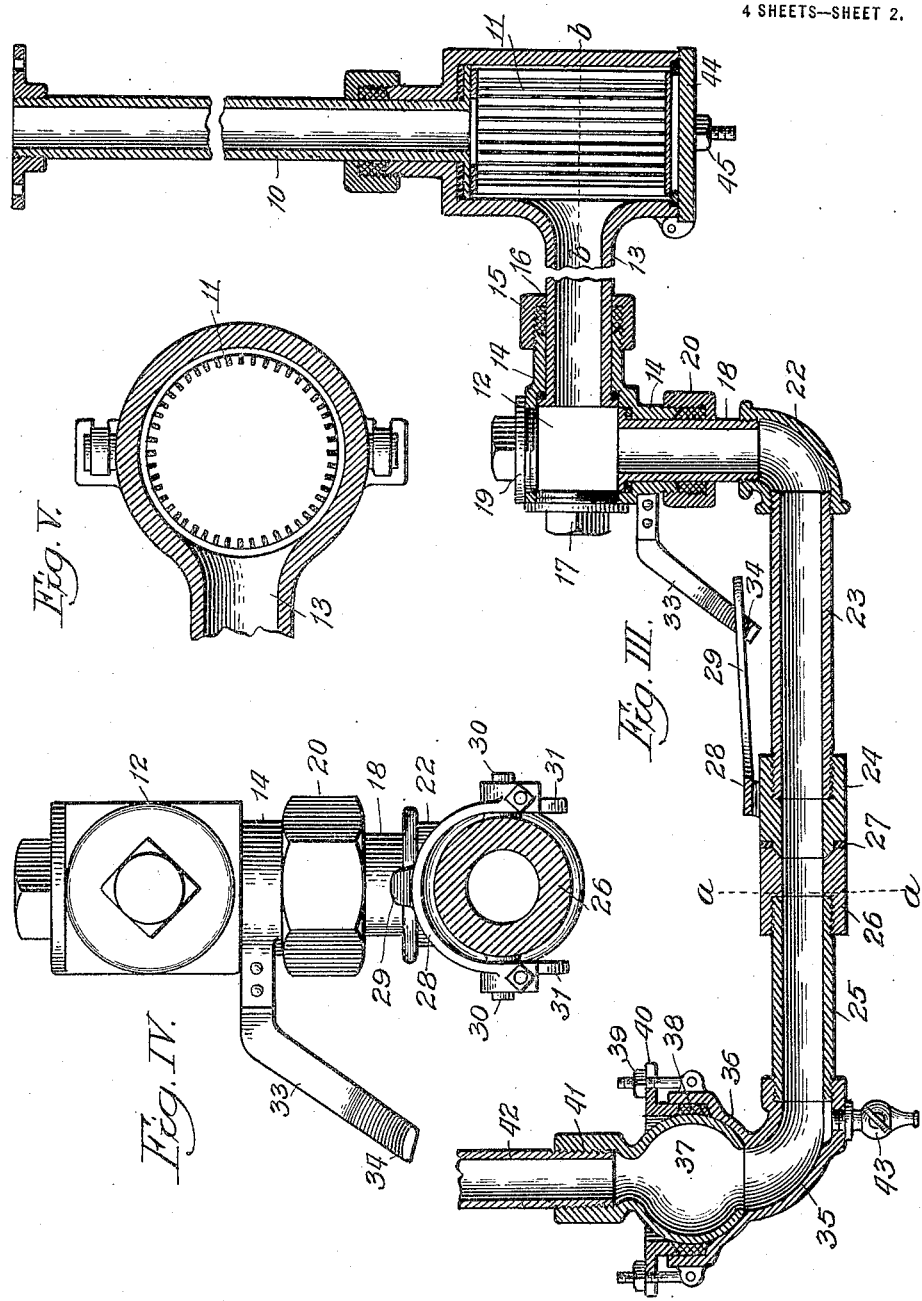

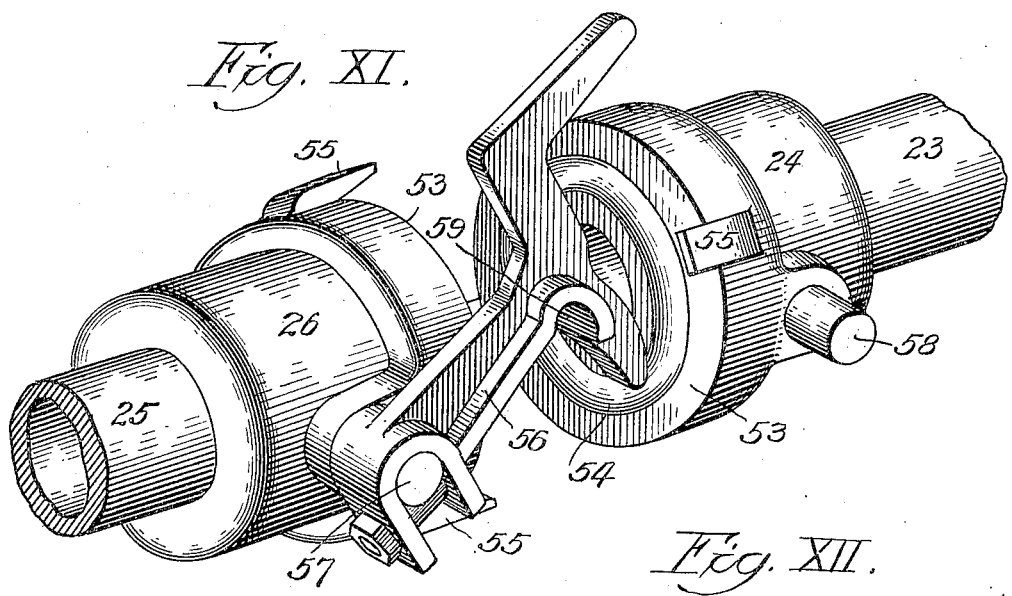
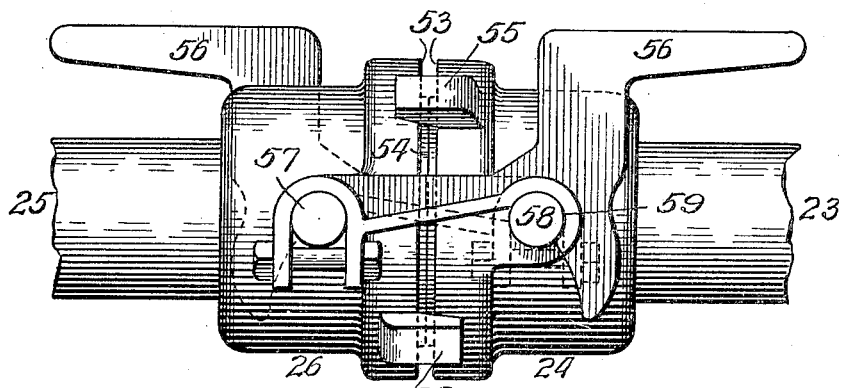
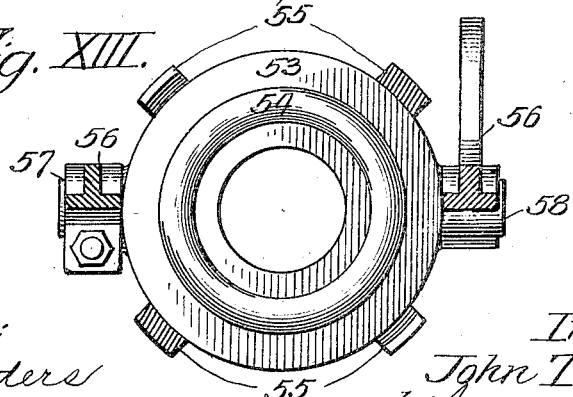

UNITED STATES PATENT OFFICE.

JOHN THOMPSON, OF CHICAGO, ILLINOIS.

COUPLING MECHANISM.

1,402,912.   Specification of Letters Patent.   Patented Jan. 10, 1922.

Application filed April 18, 1919. Serial No. 290,925.

*To all whom it may concern:*

Be it known that I, JOHN THOMPSON, a citizen of the United States, and residing at Chicago, Illinois, have invented certain new and useful Improvements in Coupling Mechanism, of which the following is a specification.

The object of my invention is to overcome the numerous defects in the present methods employed in the coupling of steam and air lines on cars, also the coupling of the engine injector to the water tank on the tender of locomotives and engines.

The present method is by use of rubber hose connections wherein the constant motion and jarring of the engine, tender and cars, the overheating of the rubber by blowing steam back into the tank to keep the water flowing and from the bending of the hose in making sharp curves and like conditions, wears and breaks out the hose coupler causing expensive repairs, loss of time, loss of steam and air and numerous like difficulties, all of which I have overcome with my invention.

With these and numerous other objects in view, my invention consists of certain novel combinations, constructions and arrangements of parts as will be hereinafter fully described and claimed.

In the accompanying drawing:—

Fig. I is a side elevation of my coupler mechanism as applied to a locomotive.

Fig. II is a side elevation of my coupler mechanism as installed upon and between the cars and coaches.

Fig. III is a cross section through Fig. I.

Fig. IV is a section on line $a$—$a$ in Fig. III.

Fig. V is a cross section through the strainer on the line $b$—$b$ in Fig. III.

Fig. VI is a perspective view of my locking link.

Fig. VII is a plan view of my modified form of locking mechanism.

Fig. VIII is a side elevation of my modified form of locking mechanism.

Fig. IX is a cross section on the line $c$—$c$ of Fig. VII.

Fig. X is a cross section on the line $d$—$d$ of Fig. VIII.

Fig. XI is a perspective view of a modified form of locking mechanism.

Fig. XII is a side elevation of a modified form of locking mechanism.

Fig. XIII is an end view of one section of a modified form of locking mechanism.

In my coupler mechanism for locomotives and engines as shown in Fig. I, the pipe 10 is shown broken away just above its connection with the strainer 11. This pipe 10 is attached to the outlet of the tank for feeding the inspirator. The strainer 11 is made so as to give ample space for the water at its greatest velocity without friction. The strainer can be placed in the circuit horizontally or vertically as required. When placed in a horizontal position it will be connected by an elbow under the tank, the purpose being that, whether horizontal or vertical, the connection will be such as to allow the engine to turn the sharpest curve without binding at any point and will have a pendulum action through my specially arranged joint 12. This joint 12 is made so as to secure the largest possible range of movement similar to a universal joint and constituting at that point a universal coupling.

On the pipe 13 which projects horizontally from the strainer 11, I provide a sleeve 14, screw threaded at the end nearest the strainer over which and in engagement with said threads I have provided a screw threaded cap 15. This cap 15 is used to tighten the joint connection and is limited in its movement by the shoulder 16. The pipe 13, terminates in a cap 17 by which a tight assembly is made in the joint. A vertical pipe 18, being a part of and a continuation of the same circuit, passes through the downwardly extending arm of the sleeve 14, said sleeve having an oppositely arranged cap 20 for assembling and tightening. This vertical elbow of the sleeve 14 is also screw threaded at the lower most end over which and in engagement with which is a screw threaded cap 20 for tightening the joint and limited in movement by shoulder 21. This joint, as will be seen is perfectly tight for either water or air line circuit and permits of a universal swivel movement.

Continuing the circuit, 22 is an elbow having screw threaded connections with the vertical pipe 18 and a horizontal pipe 23. The horizontal pipe 23 is screw threaded at both ends and engages with the screw threaded sleeve 24 of the locking mechanism. The horizontal pipe 25 is also screw threaded at both ends and engages with the sleeve 26 of the locking mechanism. For easy engagement the end of the sleeve 24 may be cone shaped. In order to make a tight connection for either air, water or the like, I provide a gasket 27. The link 28 serves to bring the two parts of the locking mechanism into engagement and holds them tightly together making a sealed joint. This link may be manually operated by means of a lever 29. The link is pivoted at 30 in such a manner as to produce a cam action so that when the arm 31 passes beyond the point 32 a holding action is secured.

As an automatic safety device where the locomotive tender or head car makes a dangerous and unusual turn around an abnormally sharp curve or the like, I provide an arm 33 which, when a certain degree of abruptness in the curve has been reached, will come into engagement with the arm 29, and catching it on the projection at 34, will raise the lever or arm 29, sufficiently to unlock the locking mechanism. In practical operation this would permit the engine and tender to go on and leave the train standing on the track uninjured. In the circuit beyond the locking mechanism just described, I provide another elbow 35 which terminates in a socket 36, at the upper end and being screw threaded at the lower end and engaging with the horizontal pipe 25. A ball 37 is provided which fits into engagement with the socket 36 for the purpose of securing a ball and socket joint, making a universal joint movement at that point in the circuit. At the sides and around the ball 37, I have provided a packing 38 to secure a perfectly tight joint. By removing or loosening the nuts 39, the cover 40 can be moved to one side and the packing 38 renewed. The upper end of the ball is screw threaded as at 41 and engages with the pipe 42 which leads to the supply line of the locomotive. Below the elbow 35 I have provided an ordinary cock 43 for draining the pipe line as and when required.

Underneath the strainer 11, I have provided a lid 44, which by loosening the nut 45, can be moved to one side for cleaning the strainer.

It will be seen from the above description that the parts described will be the same whether the coupler is applied to the engine and tender as seen in Fig. I or between the cars as seen in Fig. II, with the exception that the strainer will not be used in the mechanism when applied between the cars, and an additional joint 12ª will be provided identical in construction with joint 12, but extending vertically above the horizontal pipe line instead of below as does 12. It will also be seen that ball and socket joints can be used throughout in the coupling mechanism if desired with very slight changes such as would occur to a mechanic.

In my modified form of locking mechanism shown in Figs. 7, 8, 9 and 10, the two horizontal pipes 23 and 25 are brought into engagement and a tight fit insured by means of the gasket 27, the same as in my preferred construction of locking mechanism. In my modified form, I provide a lever 45 at the top of the pipe line pivoted at 46 to the vertical arms 47, which arms 47 are securely fastened at the side of the horizontal pipe line 25. A lever arm 48 is provided underneath the pipe line pivoted at 49 to the arms 47. A pair of arms 50 are provided pivoted at the top to the lever 45 and at the bottom to the lever 48.

A projection 51 is fixedly secured on the top of the pipe line 23, and a projection 52 at the bottom thereof. An aperture 53 in the lever arm 45 engages with the projection 51 when the locking mechanism is locked. At the same time an aperture 54 in the lever 48 engages with the projection 52. In this way the locking mechanism is made positive and secure. When it is desired to break the engagement between the pipe lines 23 and 25, the lever 45 is manually raised which, at the same time, lowers the lever 48, throwing both levers out of engagement with the projection of the pipe line 23, thus permitting a separation of the two pipe lines. A spring 55 may be provided for locking the lever arms 45 and 48 in engagement with the projections 51 and 52 respectively.

My modified form of locking mechanism as shown in Figs. XI, XII and XIII may be used when the cars are liable to be turned around; in this form the sections of coupler are all alike and consist of a flat surface 53 lined or covered with a gasket 54 or suitable means for securing an air tight joint. Guide lugs 55 are provided so as to bring the sections squarely together. Each section carries a locking arm 56 pivoted at 57, mounted on opposite sides and provided with a groove 59 which engages a pin 58 when the two sections come together, thus locking and holding in air tight connection, as shown in Fig. XII.

The constructions and modifications shown are illustrative only and applicant does not wish to be limited thereto, but other forms and arrangements may be employed without departing from my invention.

What I claim and desire to secure is:—

1. A coupler comprising a plurality of connected joints adapted to be connected in a pipe line, a sectional pipe connecting said joints, and means for locking the free ends of the pipe in fixed and air-tight relation, said means being provided with means for automatically unlocking the locking means to permit separation of and prevent injury to the parts by reason of any sharp turn.

2. A coupler comprising a plurality of joints in a pipe line, means including a lever arm for locking the free ends of the pipe line together and an arm so arranged as to engage the lever arm of the locking mechanism when a dangerous curve is made and which will automatically unlock the coupler.

3. A pipe coupler comprising a plurality of joints suitably arranged and mounted in a pipe line, a sectional pipe connecting the joints, means for locking the sections together including a projection and a lever having a hook, and means for automatically unlocking the sections to prevent injury to the structure if too sharp a curve is encountered.

In witness whereof, I hereunto subscribe my name to this specification.

JOHN THOMPSON.